US009347502B2

(12) United States Patent   (10) Patent No.: US 9,347,502 B2
Diemer et al.   (45) Date of Patent: May 24, 2016

(54) TRANSMISSION HAVING A STRAP SPRING HUB

(71) Applicant: GM Global Technology Operations LLC, Detroit, MI (US)

(72) Inventors: John A. Diemer, Farmington Hills, MI (US); Victor M. Roses, Ann Arbor, MI (US); Addison T. Solak, Ypsilanti, MI (US)

(73) Assignee: GM Global Technology Operations, LLC, Detroit, MI (US)

( * ) Notice: Subject to any disclaimer, the term of this patent is extended or adjusted under 35 U.S.C. 154(b) by 25 days.

(21) Appl. No.: 14/138,250

(22) Filed: Dec. 23, 2013

(65) Prior Publication Data

US 2015/0176661 A1 Jun. 25, 2015

(51) Int. Cl.
F16D 25/12 (2006.01)
F16D 25/0635 (2006.01)
F16D 3/62 (2006.01)
F16D 13/68 (2006.01)
F16D 25/0638 (2006.01)
F16H 57/08 (2006.01)
F16H 3/66 (2006.01)

(52) U.S. Cl.
CPC ........... *F16D 25/126* (2013.01); *F16D 3/62* (2013.01); *F16D 13/683* (2013.01); *F16D 25/0635* (2013.01); *F16D 25/0638* (2013.01); *F16D 25/123* (2013.01); *F16H 57/08* (2013.01); *F16D 2300/12* (2013.01); *F16H 3/663* (2013.01); *F16H 2200/201* (2013.01); *F16H 2200/2023* (2013.01)

(58) Field of Classification Search
CPC ...... F16D 25/126; F16D 3/005; F16D 13/644
USPC .................. 192/206, 200, 70.18; 464/100, 84
See application file for complete search history.

(56) References Cited

U.S. PATENT DOCUMENTS

| 2,694,478 | A | * | 11/1954 | Zeidler | 192/70.18 |
| 2,743,626 | A | * | 5/1956 | Schjolin | 477/139 |
| 3,722,300 | A | * | 3/1973 | Crooks | 74/15.63 |
| 4,095,683 | A | * | 6/1978 | Ban | 192/70.18 |
| 8,500,591 | B2 | * | 8/2013 | Turner et al. | 475/159 |

OTHER PUBLICATIONS

Pending U.S. Appl. No. 14/196,791, filed Mar. 4, 2014, by Tejinder Singh et al. All pages.

* cited by examiner

*Primary Examiner* — Justin Holmes
*Assistant Examiner* — David Morris

(57) ABSTRACT

A transmission comprising housing and an axially compliant hub having a central plate with an axial opening and an outer circumference. The central plate is attached to the attached to the circumference with at least one strap spring. A method of managing axial stack up in a transmission is also disclosed where the transmission has a plurality of planetary gear sets aligned in series and at least one torque transmitting device. The planetary gear has gear members. The method includes providing a an axially compliant hub having a central plate with an axial opening and an outer circumference, wherein the central plate is attached to the attached to the circumference with at least one strap spring and wherein the outer circumference is connected to the torque transmitting device and wherein the central plate is connected to a gear member of a planetary gear set.

10 Claims, 5 Drawing Sheets

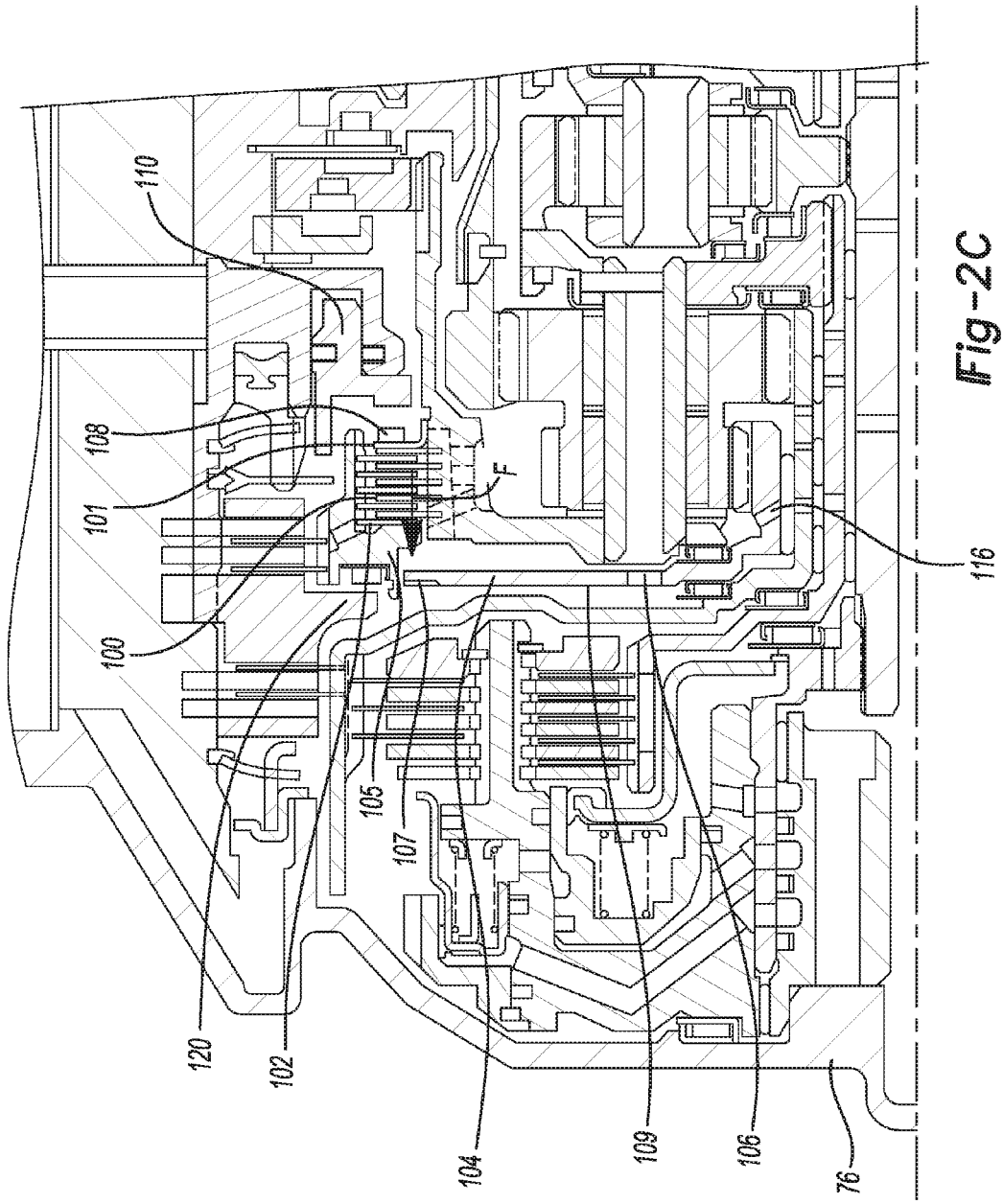

TRANSMISSION HAVING A STRAP SPRING HUB

FIELD

The present disclosure relates to a transmission with a hub having a spring strap to allow the hub to be axially compliant.

BACKGROUND

The statements in this section merely provide background information related to the present disclosure and may or may not constitute prior art.

One type of modern automatic motor vehicle transmissions contains multiple planetary gears arranged in series and multiple torque transmitting devices or clutches to transmit torque from a power source such as an engine, to the drive axle or differential. Stack up errors may result from the stacking of multiple planetary gears which may cause manufacturing difficulties in the transmission assemblies.

With reference now to FIG. 1, a partial cross section of a prior art transmission 1 is shown. The transmission 1 includes a housing 2 surrounding or encompassing the internal components which include planetary gear sets. As will be described in more detail later, the multiple planetary gear sets may result in stack up errors which may ultimately cause the hub 3 to not properly spline or connect to a clutch or gear. Improper connections may cause spline lock or other unwanted problems.

Further, because of the uncertainty of the position of the hub 3 when assembled, a proper stop to absorb the force of the clutch piston is not practical and the force of the clutch piston must travel through various transmission components before being loaded into the transmission housing 2.

It is therefore apparent that a better solution to addressing stack up errors is desirable.

SUMMARY

The present invention is a transmission comprising housing and an axially compliant hub having a central plate with an axial opening and an outer circumference. The central plate is attached to the attached to the circumference with at least one strap spring. A method of managing axial stack up in a transmission is also disclosed where the transmission has a plurality of planetary gear sets aligned in series and at least one torque transmitting device. The planetary gear has gear members. The method includes providing a an axially compliant hub having a central plate with an axial opening and an outer circumference, wherein the central plate is attached to the outer circumference with at least one strap spring and wherein the outer circumference is connected to the torque transmitting device and wherein the central plate is connected to a gear member of a planetary gear set.

It is a further aspect of this invention to provide a transmission having at least one first transmission component and at least one second transmission component wherein the central plate is drivingly connected to the at least one first transmission component and the outer circumference is drivingly connected to the second transmission component.

It is a further aspect of this invention that the first transmission component is a gear from a planetary gear.

It is a further aspect of this invention that the second transmission component is connected to a torque transmitting device.

It is a further aspect of the present invention that the central plate is drivingly connected to the at least one first transmission component using a splined connection and the outer circumference is drivingly connected to the second transmission component using a splined connection.

It is a still further aspect of the present invention to provide a central plate having a plurality of oil passage holes.

It is a further aspect of this invention to provide the outer circumference with external splines to drivingly connect the outer circumference to a torque transmitting device and provide the axial opening with external splines to drivingly connect the central plate to a gear of the planetary gear set.

It is yet another aspect of the present invention to provide the central part with a plurality of attachment holes, the outer circumference with a corresponding plurality of attachment holes, and each strap spring with an attachment hole proximate each end of the strap spring. Each strap spring is attached to outer circumference by aligning one of attachment holes proximate an end of the strap spring with an attachment hole of the outer circumference and securing it at least axially in place with a fastener. Each strap spring is attached to central part by aligning the other attachment hole proximate the other end of the strap spring with an attachment hole of the central part and securing it at least axially in place with a fastener.

It is a further aspect of this invention to provide an apply piston having a first end grounded to the housing and a housing portion. The apply piston applies a force to the torque transmitting device such that the torque transmitting device is then grounded to the housing portion.

A method of managing axial stack up in a transmission is also disclosed where the transmission has a plurality of planetary gear sets aligned in series and at least one torque transmitting device. The planetary gear has gear members. The method includes providing a an axially compliant hub having a central plate with an axial opening and an outer circumference, wherein the central plate is attached to the outer circumference with at least one strap spring and wherein the outer circumference is connected to the torque transmitting device and wherein the central plate is connected to a gear member of a planetary gear set.

It is a still further aspect of the present invention to provide a method of managing axial stack up in a transmission wherein the central part has a plurality of attachment holes, the outer circumference has a corresponding plurality of attachment holes, and each strap spring has an attachment hole proximate each end of the strap spring. Each strap spring is attached to outer circumference by aligning one of attachment holes proximate an end of the strap spring with an attachment hole of the outer circumference and securing it at least axially in place with a fastener. Each strap spring is attached to central part by aligning the other attachment hole proximate the other end of the strap spring with an attachment hole of the central part and securing it at least axially in place with a fastener.

A transmission comprising a housing; at least one gear from a planetary gear set; at least torque transmitting device; an axially compliant hub having a central plate with an axial opening and an outer circumference is also disclosed. The central plate is attached to the outer circumference with at least one strap spring. The central plate is drivingly connected to the at least one gear from a planetary gear set and the outer circumference is drivingly connected to the torque transmitting device. The central part has a plurality of attachment holes, the outer circumference has a corresponding plurality of attachment holes, and each strap spring has an attachment hole proximate each end of the strap spring. Each strap spring is attached to outer circumference by aligning one of attachment holes proximate an end of the strap spring with an attachment hole of the outer circumference and securing it at least axially in place with a fastener. Each strap spring is attached to central part by aligning the other attachment hole proximate the other end of the strap spring with an attachment hole of the central part and securing it.

Further advantages, aspects and areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

FIG. 2C is an enlarged view of a portion of FIG. 2A;

DETAILED DESCRIPTION

The following description is merely exemplary in nature and is not intended to limit the present disclosure, application, or uses.

Figure 1:
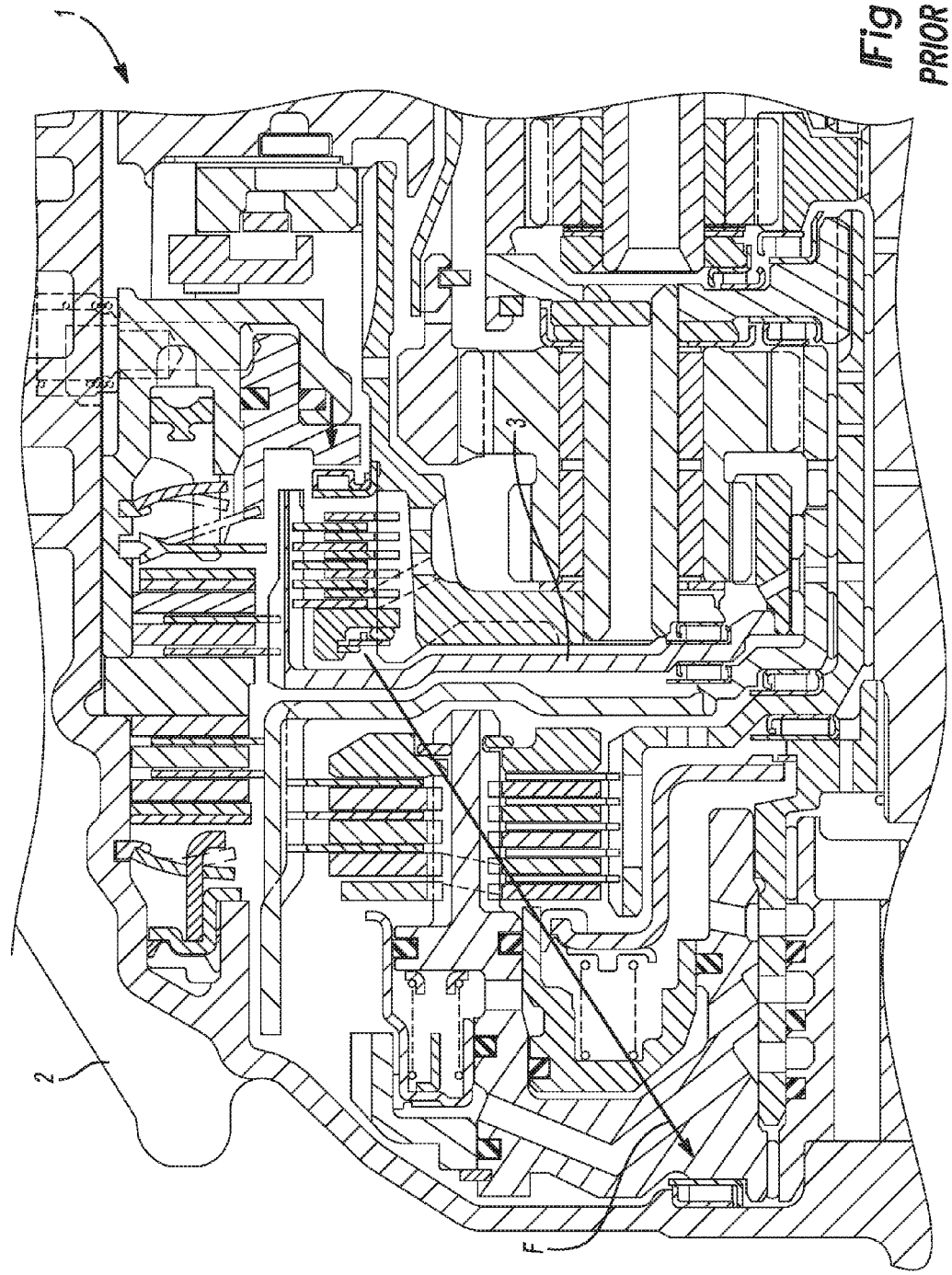
FIG. 1 is a cross sectional view of a transmission according to the prior art.
Figure 2A:
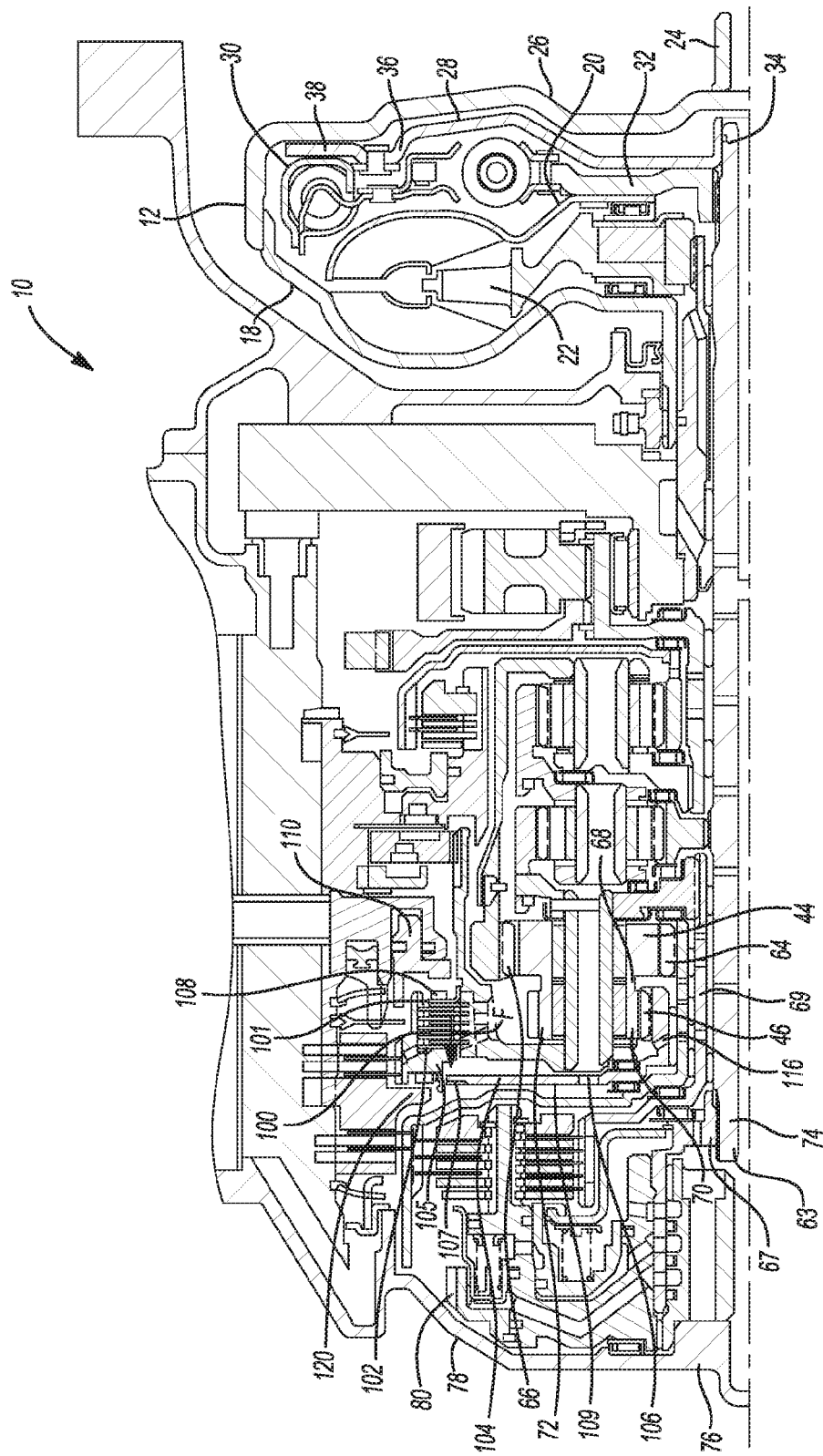
FIGS. 2A and 2B are a cross sectional view of a transmission according to the present invention.
Figure 2B:
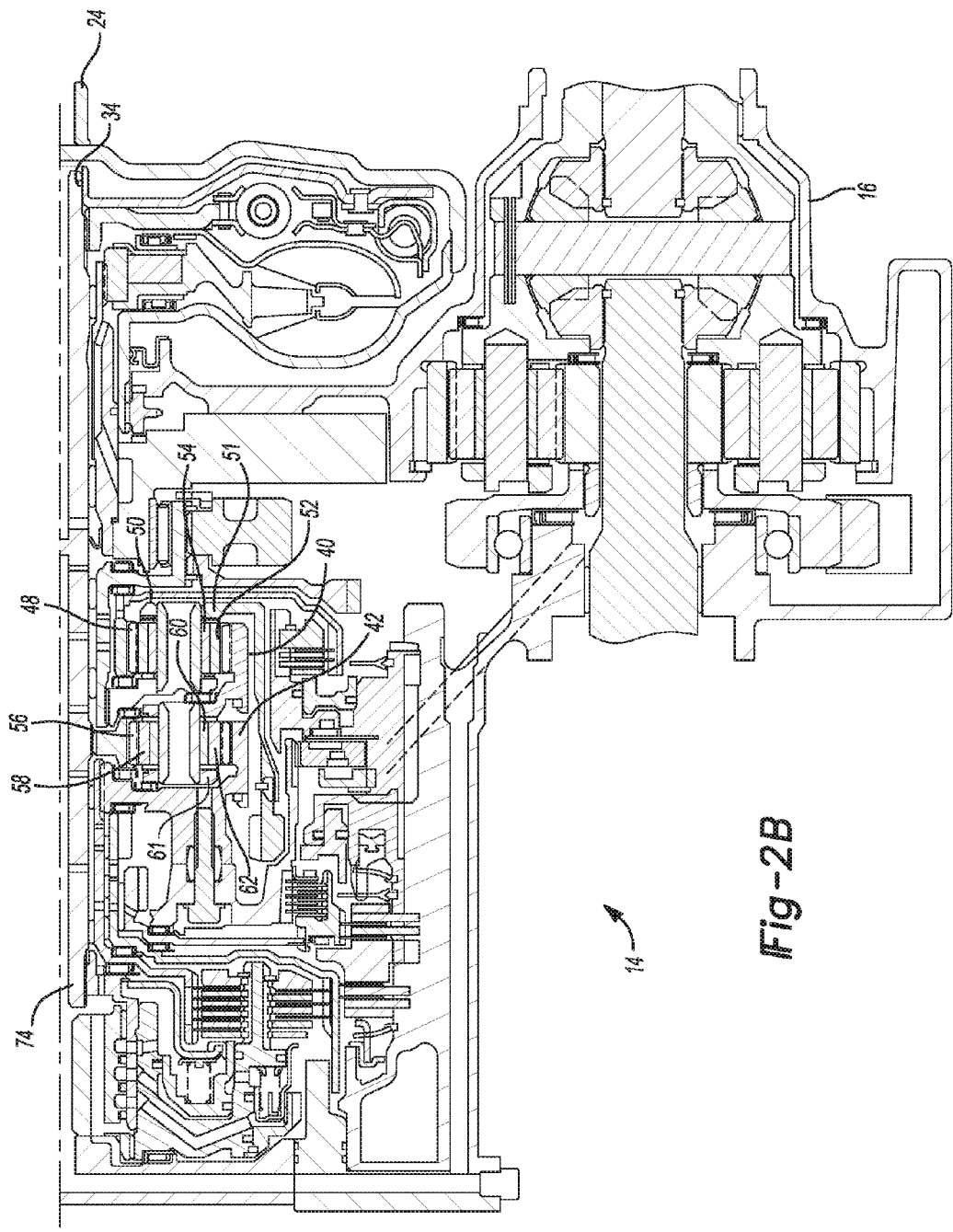

Referring to the drawings, there is shown in FIGS. 2A, 2B, and 2C a planetary transmission 10, which includes a conventional torque converter 12, planetary gear arrangement 14, and a final drive mechanism 16. The torque converter 12 includes an impeller 18, a turbine 20, and a stator 22. The impeller 18 is connected with an engine crankshaft 24 through a flex plate 26 and an input shell 28. A conventional torque converter clutch 30 is disposed between the turbine 20 and the input shell 28. The torque converter clutch 30 has one portion secured to the turbine 20 and includes a hub 32, which is splined to a transmission input shaft 34. The torque converter clutch 30 has an apply plate 36, which includes a friction surface 38 that engages the inner surface of the input shell 28. When the torque converter clutch is applied, as is well known, a direct drive between the engine crankshaft 24 and the transmission input shaft 34 is provided. During torque converter operation, a hydrodynamic drive is present between the engine crankshaft 24 and the transmission input shaft 34. These hydrodynamic-type drives are well known in the art.

The planetary gear arrangement 14 includes three planetary gear sets 40, 42, and 44. The planetary gear set 40 has a sun gear member 48, a ring gear member 52, and planet carrier assembly member 50. The planet carrier assembly member 50 includes a plurality of pinion gears 54 rotatably mounted on a planet carrier member 51.

The planetary gear set 42 includes a sun gear member 56, a ring gear member 58, and a planet carrier assembly member 60. The planet carrier assembly member 60 includes a plurality of pinion gears 62 rotatably mounted on a planet carrier member 61.

The planetary gear set 44 includes a sun gear member 64, a ring gear member 66, and a planet carrier assembly member 68. The planet carrier assembly member 68 includes a plurality of pinion gears 70 rotatably mounted on a planet carrier member 69. Gear 72 may be connected to planet carrier assembly member 68. Each of these planetary gear sets has some manufacturing tolerances when finally assembled.

The input shaft 34 has an end section 74 that is rotatably supported on a housing extension 67 that is secured to a transmission housing 76. The housing extension 76 is stationary as is the housing 78 relative to the rotation of the transmission input shaft 34. The end section 63 has drivingly connected therewith a clutch housing or hub 80.

As is well known in the art, the planetary gear arrangement 14 includes rotating-type torque-transmitting mechanisms or clutches and stationary-type torque-transmitting mechanisms or brakes. Only one rotating-type torque transmitting device 100, a clutch, will be discussed. The clutch 100 has a plurality of friction or clutch plates 102 that may be splined to hub member 105 which in turn may be splined to an outer circumference 107 of a hub 104, and a plurality of friction plates 101 that are splined with a member 108. The clutch 100 also includes an apply piston 110. The hub 104 is splined or otherwise drivingly connected to gear 72. Thus, when the apply piston is pressurized sufficiently, the clutch 100 will engage thereby limiting movement of one of the gears.

Various connecting members may connect one of the gears of the planetary gears to another gear of another planetary gear or the housing 78. The above description is for reference only as one embodiment of the invention does not depend on any particular gear combination or power flow through the transmission as will be described below.

One potential problem with the stack up of multiple planetary gears is axial tolerances add up creating alignment issues wherein components may not be properly positioned. For example, the stack up errors in this case may cause the splines of hub 104 to not fully engage the splines of gear 72 or hub member 105.

Figure 3:
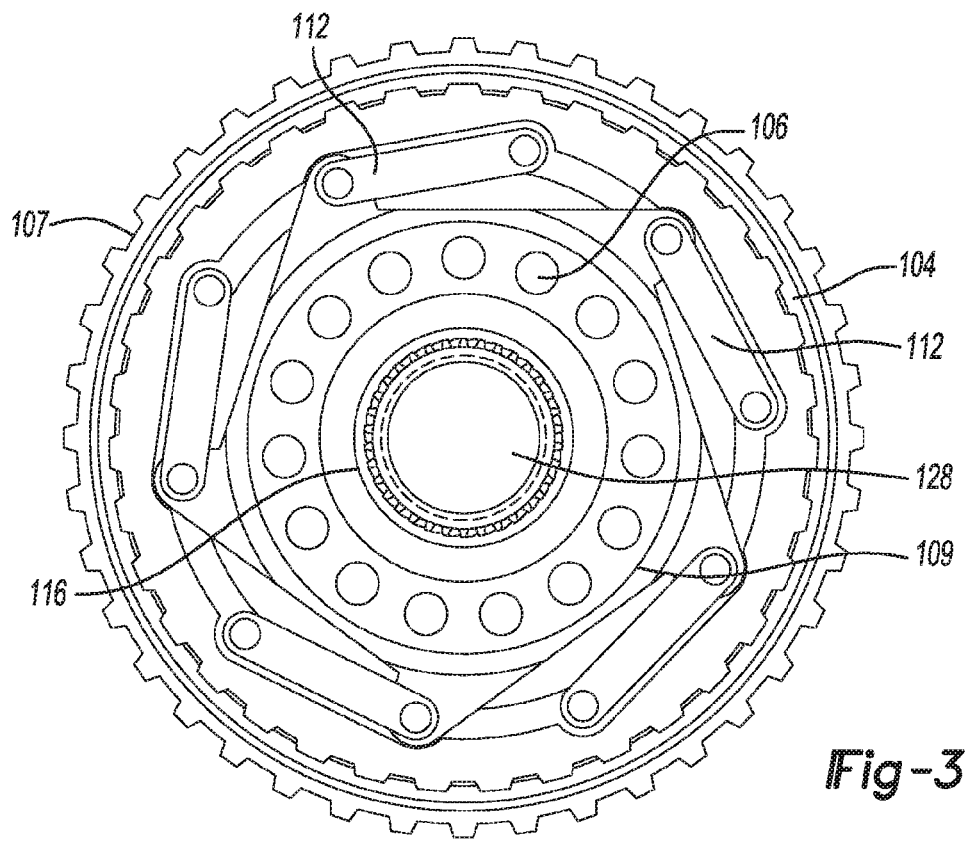
FIG. 3 is a front perspective view of a hub having a strap spring.
Figure 4:
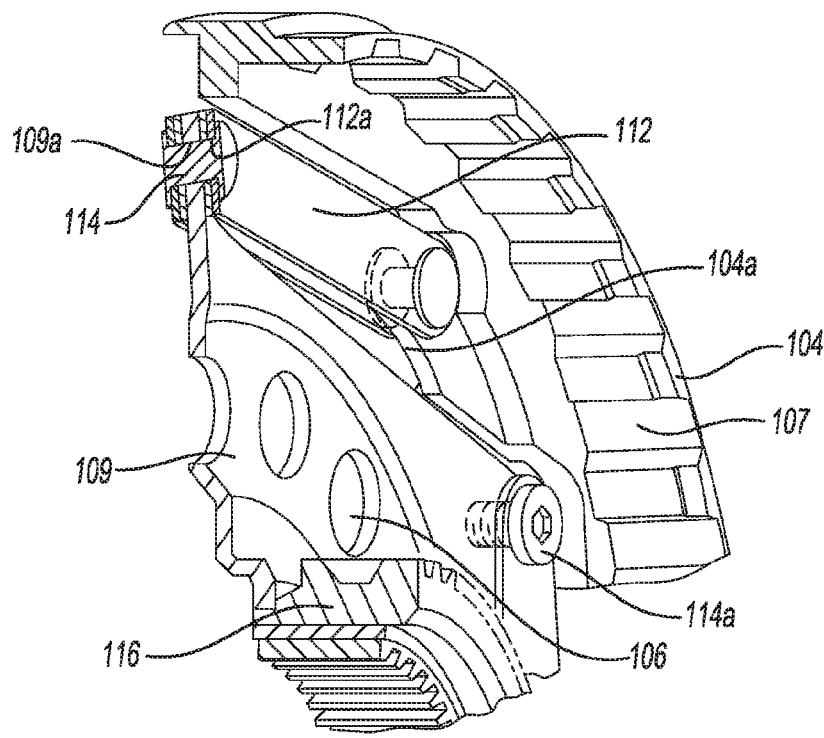
FIG. 4 is a sectional view of a hub having a strap spring.

The hub of the present invention solves this problem by being axially compliant. As shown in FIGS. 3 and 4, hub 104 comprises an outer circumference 107 which may be splined to attach to another transmission component such as hub member 105 and a central plate 109 which is connected to the outer circumference using strap springs 112. The strap springs 112 allow the central plate 109 to have axial movement relative to the outer circumference 107. The axial movement allows both the central 109 and the outer circumference 107 to be fully connected to their respective connecting members.

Although the figures show the hub 104 having 5 strap springs, more or less may be used. The spring straps may be connected to the outer circumference 107 and the central plate 109 using any of a variety of techniques such as permanent and removable fasteners. The drawings depict using a permanent rivet-type 114 fastener inserted through holes in both the central plate 109a and holes in the outer circumference 104a and holes 112a through the strap spring 112 proximate the ends of the strap spring. Once the rivet-type fastener 114 is inserted through the holes, one or both ends are deformed to lock the rivet-type fastener 114 in place. The strap spring 112 is connected to the central plate 109 and the outer circumference at least axially and maybe further secured against radial and rotation.

The strap springs 112 allow some axial movement between the central part 109 and the outer circumference 107 to accommodate the stack up errors and make the hub 104 axially compliant.

The central plate 109 may also contain oil passage holes 106 to allow oil to better flow through the transmission housing rather than through less efficient means such as through the shaft. The central plate 109 may be splined directly in the axial opening 128, or may have a separate splined hub 116 that is attached to the central plate 109 through known techniques.

The outer circumference 107, the central plate 109, and the strap springs 112 may be manufactured out of any material capable of handling the torque and other operating conditions such as metal.

Another benefit of the axially compliant hub 104 is that it allows the force F of the apply piston 110 to load into the transmission housing directly through housing portion 120. Allowing the force F to transmit into the housing 78 in this manner allows for a smaller packaging space compared to the prior art. Because of stack up tolerance and errors of the prior art design, it was not practical to have such a defined and definite housing 78 member to accept the force F from the apply piston 110. The stack up errors could have prevented the apply piston 110 from providing any movement on the friction or clutch plates 102 and 101.

A method of managing axial stack up in a transmission is also disclosed. As discussed above, the transmission has a plurality of planetary gear sets 40, 42 and 44 aligned in series. The planetary gears have gear members 46-52. The transmission further includes at least one torque transmitting device 100.

An axially compliant hub 104 having a central plate 109 with an axial opening 128 and an outer circumference 107 is provided. The central plate 109 is attached to the outer circumference 107 with at least one strap spring 112. The outer circumference 107 is connected to the torque transmitting device 100. The central plate 109 is connected to a gear member of a planetary gear set.

The central part 109 has a plurality of attachment holes 109a, the outer circumference has a corresponding plurality of attachment holes 104a, and each strap spring has an attachment hole 112a proximate each end of the strap spring wherein each strap spring is attached to outer circumference 104 by aligning one of attachment holes 112a proximate an end of the strap spring with an attachment hole of the outer circumference 104a and securing it at least axially in place with a fastener 114 and wherein each strap spring is attached to central part by aligning the other attachment hole 112a proximate the other end of the strap spring with an attachment hole 109a of the central part and securing it at least axially in place with a fastener 114.

The fastener 114 may be a rivet-type fastener.

The description of the invention is merely exemplary in nature and variations that do not depart from the gist of the invention are intended to be within the scope of the invention. Such variations are not to be regarded as a departure from the spirit and scope of the invention.

What is claimed is:

1. A method of managing axial compliance stack up in a transmission, the transmission having a housing and a plurality of planetary gear sets aligned in series, the planetary gear sets having gear members, and at least one torque transmitting device wherein the torque transmitting device comprises clutch plates and a piston operable to apply a force to the torque transmitting device so as to ground the torque transmitting device to the housing, the method comprising:
   providing an axially compliant hub having a central plate with an axial opening and an outer circumference, wherein the central plate is attached to the outer circumference with at least one strap spring; and
   attaching the outer circumference to the clutch plates and wherein the central plate is connected to a gear member of a planetary gear set.

2. The method of claim 1 wherein the central plate has a plurality of attachment holes, the outer circumference has a corresponding plurality of attachment holes, and each strap spring has an attachment hole proximate each end of the strap spring wherein each strap spring is attached to the outer circumference by aligning one of the attachment holes proximate an end of the strap spring with an attachment hole of the outer circumference and securing it at least axially in place with a first fastener and wherein each strap spring is attached to central plate by aligning the other attachment hole proximate the other end of the strap spring with an attachment hole of the central plate and securing it at least axially in place with a second fastener.

3. The method of claim 2 wherein the first fastener is a rivet-type fastener.

4. A transmission comprising:
   a housing;
   at least one gear from a planetary gear set;
   at least one torque transmitting device having a non rotating piston having a piston housing grounded to the housing, the torque transmitting device also having rotating clutch friction plates;
   an axially compliant hub having a central plate with an axial opening and an outer circumference, wherein the rotating clutch friction plates are connected to the outer circumference,
   wherein the central plate is attached to the circumference with at least one strap spring
   wherein the central plate is drivingly connected to the at least one gear from the planetary gear set and the outer circumference is drivingly connected to the torque transmitting device
   wherein the central plate has a plurality of attachment holes, the outer circumference has a corresponding plurality of attachment holes, and each strap spring has an attachment hole proximate each end of the strap spring wherein each strap spring is attached to outer circumference by aligning one of attachment holes proximate an end of the strap spring with an attachment hole of the outer circumference and securing it at least axially in place with a first fastener and wherein each strap spring is attached to central plate by aligning the other attachment hole proximate the other end of the strap spring with an attachment hole of the central plate and securing it at least axially in place with a second fastener.

5. The transmission of claim 4 wherein the first fastener is a rivet-type fastener.

6. A transmission comprising:
   a housing;
   at least one gear from a planetary gear set;
   at least one torque transmitting device having a non rotating piston operable to apply a force to the torque transmitting device so as to ground the torque transmitting device to the housing, the torque transmitting device also having one or more rotating friction plates;
   an axially compliant hub having a central plate with an axial opening and an outer circumference, wherein the one or more rotating friction plates are connected to the outer circumference,
   wherein the central plate is attached to the circumference with at least one strap spring,
   wherein the central plate is drivingly connected to the at least one gear from the planetary gear set.

7. The transmission of claim 6 wherein the central plate is drivingly connected to the at least one gear from the planetary gear set using a first splined connection and the outer circumference is drivingly connected to the rotating friction plates using a second splined connection.

8. The transmission of claim 6 wherein the central plate has a plurality of oil passage holes.

9. The transmission of claim 6 wherein the central plate, the outer circumference and the strap spring are made out of metal.

10. The transmission of claim 6 wherein the central plate has a plurality of attachment holes, the outer circumference has a corresponding plurality of attachment holes, and each strap spring has an attachment hole proximate each end of the strap spring wherein each strap spring is attached to outer circumference by aligning one of attachment holes proximate an end of the strap spring with an attachment hole of the outer circumference and securing it at least axially in place with a first fastener and wherein each strap spring is attached to central plate by aligning the other attachment hole proximate the other end of the strap spring with an attachment hole of the central plate and securing it at least axially in place with a second fastener.

\* \* \* \* \*